United States Patent [19]
Higgs

[11] Patent Number: 5,633,295
[45] Date of Patent: May 27, 1997

[54] COATED FILLER FOR A THERMOPLASTIC COMPOSITION

[75] Inventor: Robert P. Higgs, St. Austell, United Kingdom

[73] Assignee: ECC International Limited, United Kingdom

[21] Appl. No.: 543,125

[22] Filed: Oct. 13, 1995

Related U.S. Application Data

[63] Continuation of Ser. No. 219,393, Mar. 29, 1994, abandoned.

[30] Foreign Application Priority Data

Mar. 31, 1993 [GB] United Kingdom ............ 9306683

[51] Int. Cl.$^6$ .................... C08K 9/04; B32B 19/00; B05D 1/00
[52] U.S. Cl. .................... 523/205; 523/200; 523/206; 523/334; 427/221; 428/407
[58] Field of Search ................ 523/205, 206, 523/334; 428/407; 427/221

[56] References Cited

U.S. PATENT DOCUMENTS

| | | | |
|---|---|---|---|
| 4,800,103 | 1/1989 | Jeffs | 523/205 |
| 4,891,392 | 1/1990 | Abe et al. | 523/200 |
| 5,458,973 | 10/1995 | Jeffs | 428/407 |

FOREIGN PATENT DOCUMENTS

| | | |
|---|---|---|
| 2016447 | 11/1990 | Canada. |
| 0397165 | 11/1990 | European Pat. Off.. |
| 0466514 | 1/1992 | European Pat. Off.. |
| 1166366 | 10/1969 | United Kingdom. |
| 1538718 | 1/1979 | United Kingdom. |
| 1600895 | 10/1981 | United Kingdom. |
| 2179665 | 3/1987 | United Kingdom. |
| 2220666 | 1/1990 | United Kingdom. |

OTHER PUBLICATIONS

Higgs et al., "Polymer coated fillers improve polypropylene scrathch performance", paper presented at conference in Birmingham, England in May 1992.

*Primary Examiner*—Tae Yoon
*Attorney, Agent, or Firm*—Klauber & Jackson

[57] ABSTRACT

There is disclosed a thermoplastics composition comprising a thermoplastic polymer having incorporated therein a coated particulate inorganic material. The coating on the particles of the inorganic material comprises a combination of a natural or synthetic polymeric material and a wax having a melting point not higher than the melting point of the thermoplastics polymer, and the polymeric material is present in the coating in an amount of from 1% to 10% by weight, based on the weight of dry inorganic material.

The improved thermoplastic composition of the invention may be used in making moulded components for automobiles.

8 Claims, No Drawings

COATED FILLER FOR A THERMOPLASTIC COMPOSITION

This application is a continuation of application No. 08/219,393, filed Mar. 29, 1994, now abandoned.

This invention relates to an improved filler and to a process for preparing the improved filler. The improved filler of the invention is suitable as a filler for a thermoplastic composition, particularly a polyolefin composition, for example one comprising a homopolymer or copolymer of propylene which may be used in making moulded components for automobiles.

In recent years there has been an increasing trend to make many components of automobiles, especially interior fittings, of plastics rather than of metallic materials. Initially these components were made of ABS or other polymer blends of the engineering plastics type, but these materials are expensive. Materials which are attractive for this purpose on account of their relatively low price are polyolefins. However, polyolefin compositions generally suffer from the problem of having low stiffness and impact resistance, and it has been found that it is necessary to add a mineral filler to a polyolefin composition in order to improve the mechanical properties to an acceptable level.

One mineral which has been used for this purpose is talc, which is found to have a surface which is compatible with polyolefins to an acceptable degree, and which is therefore relatively easily dispersible in a polyolefin composition. The use of talc, however, is found to have the disadvantage that the surface of polyolefin components containing it as a filler is easily marked or scratched. When the surface of a talc-filled polyolefin component is damaged in this way the resultant disturbance of the surface layer causes talc particles to be exposed, and shows itself in a whitening of the surface and an increase in gloss in the affected area.

This effect is most noticeable when the polyolefin component has a finely textured matt surface. The whitening effect is most noticeable when the polyolefin component is black or dark in colour, but the localised increase in gloss is observed with most surface colours, even when the indentation of the surface is only slight, as results, for example, from a light rubbing or scuffing.

GB-A-2179665 and GB-A-22 20666 describe latex coated fillers for incorporation into a thermoplastic composition.

According to a first aspect of the present invention, there is provided a thermoplastics composition comprising a thermoplastic polymer having incorporated therein a coated particulate inorganic material, the coating on the particles of the inorganic material comprising a combination of a natural or synthetic polymeric material and a wax having a melting point not higher than the melting point of the thermoplastics polymer, the polymeric material being present in the coating in an amount of from 1% to 10% by weight, based on the weight of dry inorganic material.

The coated inorganic filler incorporated into the thermoplastic polymer may be made, in accordance with a second aspect of the present invention, by a process which comprises combining, in aqueous suspension, the particulate inorganic material, the wax and a natural or synthetic latex composition in an amount such as to provide a coating on the particles of the inorganic material of from 1% to 10% by weight of latex solids, based on the weight of dry inorganic material. The suspension is then dewatered and dried. Drying may be performed using a spray drier which may result in hollow microspheres having diameters up to 0.5 mm in size, and preferably no smaller than 0.02 mm. The spray dried product may be pulverized, if desired.

The coated inorganic material is incorporated in a thermoplastic composition to improve the mechanical properties thereof. It has been found that moulded components made from the thermoplastics composition including the improved filler have enhanced resistance to scratching and other mechanical damage. Preferably, the thermoplastic composition is a polyolefin composition, more preferably a composition comprising a homopolymer or copolymer of propylene.

The particulate inorganic material may be chosen from a kaolinitic clay, e.g. kaolin or ball clay, a calcined kaolinitic clay, calcium carbonates, silicates of aluminium and calcium, e.g. the natural calcium silicate known as wollastonite, bauxite, talc, mica, alumina trihydrate, silica, carbonates and hydroxides of magnesium, e.g. natural hydrotalcite, dolomite, i.e. the natural double carbonate of calcium and magnesium, calcium sulphate, e.g. gypsum and anhydrite, titanium dioxide and mixtures of any two or more of these. The inorganic material may be natural or synthetic, and, in particular, both natural and synthetic forms of calcium carbonate, silicates of aluminium and calcium, silica, carbonates and hydroxides of magnesium, calcium sulphate and titanium dioxide are within the scope of this invention. Where the inorganic material is synthetic it may be precipitated as in the case of calcium carbonate, silica and titanium dioxide. The inorganic materials specified above are commonly regarded as "white" inorganic materials; but the term "white" does not necessarily mean that the mineral has a pure white colour, but that the colour is substantially free of any strong non-white hue. Many of the inorganic materials which may be employed in the present invention are crystalline.

Preferably the particles of the inorganic material are no larger than about 100 µm, more preferably no larger than 50 µm, and most preferably no larger than 20 µm. The specific surface area of the inorganic material as measured by the BET nitrogen absorption method is preferably at least 1 $m^2g^{-1}$ and preferably no greater than about 300 $m^2g^{-1}$. More preferably, the specific surface area of the inorganic material is in the range from 2 to 10 $m^2g^{-1}$.

The natural or synthetic polymeric material forming the coating on the particles is desirably one derived from a natural or synthetic latex. Preferably, although not essentially it is an elastomer.

In the process of the present invention, the particulate inorganic material is preferably provided in the form of an aqueous suspension containing up to about 65% by weight of the dry inorganic material, and preferably at least 50%, although it should be appreciated that suspensions having as little as 20% by weight of the dry inorganic material can be used and these may not require a dispersing agent. This suspension may be dispersed with the aid of a dispersing agent, for example from about 0.05% to about 0.5% by weight, based on the weight of the dry inorganic material, of a dispersing agent for the inorganic material. The dispersing agent for the inorganic material is preferably a water soluble salt of a poly(acrylic acid) or of a poly(methacrylic acid) having a number average molecular weight of not more than 10,000.

The natural or synthetic latex composition may advantageously comprise an elastomer, for example a natural rubber or a natural rubber which has been substituted with functional groups or a synthetic rubber such as a styrene butadiene rubber (SBR). Other suitable latices include those formed from certain elastomeric or non-elastomeric acrylic copolymers, elastomeric copolymers being preferred. Advantageously the acrylic copolymer comprises a lower alkyl ($C_{1-4}$) ester of acrylic acid and a lower alkyl ($C_{1-4}$) ester of methacrylic acid. Especially preferred is a copolymer of ethyl acrylate and methyl methacrylate. Also suitable are copolymers of lower alkyl acrylic esters with vinyl acetate, styrene or acrylonitrile. A latex of a non-elastomeric material such as poly(vinyl acetate) or a copolymer of vinyl acetate may also be used in this invention. The latex composition is a stabilised suspension of polymer particles in water and will generally contain about 40% to 60% by weight of solids. The latex may be stabilised with the aid of a surfactant or a water-soluble colloid.

The wax should have a melting point which is lower than that of the thermoplastic composition into which the coated inorganic filler is to be incorporated. Typically, therefore, the wax has a melting point no greater than 160° C.; the melting point of the wax should also not be too low, for instance no lower than 50° C. Preferably the wax has a melting point in the range from 70° to 150° C. The wax may be a hydrocarbon wax, for example a polyolefin wax, such as a polypropylene wax, but for most advantageous results the wax preferably has polar functional groups, for example amide groups. Especially suitable are waxes which are formed by reacting together an alkylene diamine and a fatty acid having from 8 to 20 carbon atoms. The amount of the wax used is preferably in the range from about 0.5 to about 5% by weight, based on the weight of the dry inorganic material.

In the process of the present invention, the wax is preferably introduced as an emulsion in water and the emulsion may conveniently comprise from about 15% to about 20% by weight of wax solids and from about 0.5% to about 5% by weight, based on the weight of the wax solids of a nonionic surfactant. The wax emulsion may conveniently be mixed with the suspension of the particulate inorganic material before the suspension of the particulate inorganic material is mixed with the latex. It may alternatively be convenient to introduce the wax in a different form, for example as a finely divided dry powder.

The coated inorganic filler may also incorporate a pigmentary material, for example carbon black. Advantageously, in the process aspect, the pigmentary material is mixed with water, and optionally a dispersing agent, to form a dispersed aqueous suspension before it is mixed with the suspension of the inorganic material and with the latex. The aqueous suspension preferably contains from about 5 to about 25% by weight of the pigmentary material and from 0.1 to 5% by weight, based on the weight of the pigmentary material, of a dispersing agent for the pigmentary material. The dispersing agent for the pigmentary material may be a water soluble salt of a poly(acrylic acid), a poly(methacrylic acid) or of a copolymer of containing from 10% to 80% by weight of acrylonitrile or methacrylonitrile monomer units, and from 90% to 20% by weight of acrylic acid or methacrylic acid monomer units. The number average molecular weight of the dispersing agent for the pigmentary material is preferably not greater than 10,000. Further details on the incorporation of a carbon black pigment into the filler can be found in our British Patent Specification No. 2220666.

In the process aspect of the present invention, the order in which the suspension of the inorganic material and wax, the suspension of the pigmentary material, if used, and the latex are added together is unimportant. For example the suspension of the inorganic material and wax can be mixed with the suspension of the pigmentary material and the latex added to the mixed suspension thus formed. Alternatively the suspension of the inorganic material and wax may be mixed with the latex and the suspension of the pigmentary material added to the mixture thus formed. Instead of mixing the wax with the suspension of the inorganic material, it may alternatively be mixed with the latex or with the suspension of the pigmentary material, or it may be added last to the mixed suspension of inorganic material, latex, and pigmentary material, if used.

The present invention also provides the coated inorganic material per se as well as a process for preparing the coated inorganic material.

Furthermore, the present invention relates to moulded components, for example components for automobiles, made from the thermoplastic composition of the present invention.

The present invention will now be illustrated by the following Example.

EXAMPLE

A number of different coated inorganic fillers were prepared in the following way:

A carbon black powder having an average particle diameter of 0.02 µm was dispersed in a quantity of water so as to form a suspension containing 20% by weight of the carbon black, there being dissolved in the water 2% by weight, based on the weight of dry carbon black, of a sodium polyacrylate dispersing agent having a number average molecular weight of about 3,000. Portions of this carbon black suspension were then added to mixed suspensions of kaolin, wax and latex. These mixed suspensions were prepared by first mixing a suspension containing 60% by weight of a paper filler grade kaolin clay, 0.2% by weight, based .on the weight of dry kaolin, of the same dispersing agent as was used for the carbon black, 0.1% by weight, based on the weight of dry kaolin, of a nontonic surfactant and a given quantity of a wax emulsion containing 18% by weight of dry wax solids. This suspension of kaolin and wax was then mixed with a given quantity of a latex containing 50% by weight of an elastomeric acrylic copolymer of ethyl acrylate and methyl methacrylate. In each case the quantity of the suspension of the carbon black powder was such that the quantity of carbon black was 2% by weight, based on the weight of dry kaolin clay. The quantities of latex used were such that the fillers contained 0%, 1%, 2%, 3% or 5% by weight of the dry elastomeric copolymer, based on the weight of dry kaolin clay. The wax was either a bis-stearoyl/palmitoyl-ethylene diamine wax or a polypropylene wax, and the wax was added in a quantity such as to provide 0%, 2.5% or 5% by weight of dry wax solids, based on the weight of dry kaolin clay. In each case the melting point of the wax was in the range from 70° to 150° C.

The kaolin clay had a particle size distribution such that 11% by weight consisted of particles having an equivalent spherical diameter larger than 10 µm and 30% by weight consisted of particles having an equivalent spherical diameter smaller than 2 µm. The specific surface area as measured by the BET method was 8.0 $m^2g^{-1}$.

In each case the resultant mixed suspension was fed to the atomizer of a spray dryer the inlet temperature of which was 300° C. and the solid components of the mixture were recovered in the form of dry hollow microspheres of diameter in the range from 0.02 to 0.1 mm.

Each coated filler product was incorporated into a polypropylene composition which comprised 75% by weight of an ethylene/propylene block copolymer premix powder and 25% by weight of the coated filler. The ingredients were compounded together using an APV M2030 twin-screw compounder and the resultant mixture was injection moulded to form a number of standard test specimens for the following tests.

Notched impact strength was measured by means of a procedure in which a weighted pendulum was allowed to swing through a fixed distance on to a standard notched specimen with sufficient momentum to break the specimen. The energy per unit area of the specimen was recorded in $KJ.m^{-2}$.

Falling weight impact energy was determined by means of a Rosand falling weight impact tester in which a 25 Kg weight having a 20 mm hemispherical top was allowed to fall through a height of 820 mm on to a test disc of diameter 102 mm and thickness 1.5 mm supported on a ring of internal diameter 45 mm. A transducer monitored the vertical deflection of the centre of the disc with time after contact with the falling weight and the energy in Joules absorbed before rupture occurred was calculated.

Flexural modulus was determined by the method laid down in British Standard Specification 2782: Part III, Method 304C and was recorded in gigapascals.

Gloss was measured using a Hunterlab D16 glossmeter set at an angle of 60° with the normal to the plane of the test specimen. The results were expressed as a percentage of the incident light which was reflected at an angle of 60° with the normal.

Scratch depth was determined by making five parallel scratches on a test disc of diameter 100 mm and thickness 2 mm by drawing five times across the face of the test disc a scratch head which comprised a 1 mm diameter steel ball acted upon by a 800 g weight. An area of the marked disc which encompassed part of the five scratches was then scanned by the measuring head of a TALYSTEP™ profilometer, which was linked to a computer which controlled the movement of the test disc beneath the head while recording the deflection of the head from a given reference height. Repeated scanning of the test area provided a three-dimensional graphic representation of the scratched surface. It was possible from this representation to identify the scratches and to measure their depth. An average depth in µm was obtained.

Scratch whiteness, which is a measure of the degree to which individual filler particles have been torn from the polypropylene composition by the scratching, and thus exposed, was determined by scanning the scratched area of the disc with an optical sensor head which was coupled to an image analyzer. The shade of grey of the area beneath the sensor was recorded on a scale which varied from 0 for black to 255 for white and a value was obtained for each of the five scratches and an average value calculated.

As a control the measurements were repeated using test pieces which had been formed by injection moulding of a polypropylene composition which consisted of 76.3% by weight of the same polymer as was used in the experiments described above, 22.5% by weight of talc and 1.2% by weight of carbon black powder added separately.

The talc had a particle size distribution such that 1% by weight consisted of particles having an equivalent spherical diameter larger than 10 µm, 25% by weight consisted of particles having an equivalent spherical diameter smaller than 2 µm and the specific surface area as measured by the BET method was 10 $m^2g^{-1}$.

The results obtained are set forth in Table 1 below:

TABLE 1

| Wax type | % by weight wax | % by weight latex | Notched impact energy (KJm$^{-2}$) | Falling impact energy (J) | Flexural modulus | Gloss (%) | Scratch depth (µm) | Scratch whiteness |
|---|---|---|---|---|---|---|---|---|
| — | 0 | 5 | 3.6 | 4.9 | 2.0 | 52 | 4.7 | 24 |
| — | 0 | 2 | 4.9 | 6.5 | 2.2 | 52 | 6.0 | 29 |
| A | 2.5 | 2 | 5.4 | 7.2 | 2.1 | 46 | 3.8 | 8 |
| A | 5 | 2 | 6.0 | 7.4 | 2.0 | 49 | 3.7 | 8 |
| A | 5 | 5 | 4.9 | 6.0 | 1.7 | 49 | 3.5 | 10 |
| B | 2.5 | 1 | 6.3 | 7.3 | 2.0 | 51 | 7.6 | 26 |
| B | 2.5 | 2 | 5.3 | 7.5 | 2.2 | 51 | 7.0 | 35 |
| B | 2.5 | 3 | 5.5 | 7.2 | 2.2 | 52 | 5.0 | 20 |
| B | 5 | 5 | 5.2 | 4.8 | 1.7 | 46 | 3.7 | 17 |
| B | 5 | 0 | 6.7 | 9.2 | 2.0 | 52 | 7.5 | 71 |
| Control (talc) | — | — | 5.2 | 8.0 | 2.5 | 48 | 6.5 | 75 |

In Table 1, wax "A" was a bis-stearoyl/palmitoyl ethylene diamine wax and wax "B" was a low molecular weight polypropylene wax.

These results show that wax type "A" gives greater protection against scratching and marking than wax type "B". The best combination of strength properties and resistance to scratching and marking is given by a kaolinitic clay which is coated with 2% by weight of latex solids, based on the weight of dry kaolin, and 2.5–5.0% by weight of a wax of type "A", based on the weight of dry kaolin.

I claim:

1. A process for preparing a coated particulate inorganic material for incorporation in a thermoplastics composition which comprises the steps of (a) combining in aqueous suspension, a particulate inorganic material, a wax and a natural or synthetic latex composition in an amount such as to provide a coating on the particles of the inorganic material of from 1% to 10% by weight of latex solids, based on the weight of dry inorganic material; and (b) dewatering and drying the suspension.

2. The process of claim 1, wherein the wax has a melting point of no greater than 160° C.

3. The process of claim 1, wherein the melting point of the wax is at least 50° C.

4. The process of claim 1, wherein the wax has a melting point in the range of 70° to 150° C.

5. The process of claim 1, wherein the wax is a hydrocarbon wax.

6. The process of claim 5, wherein the wax has polar functional groups.

7. The process of claim 1, wherein the wax is one which results from the reaction of a $C_8$–$C_{20}$ alkylene diamine with a $C_8$–$C_{20}$ fatty acid.

8. The process of claim 1, wherein the wax is employed in an amount of 0.5 to 5% by weight, based on the weight of the dry inorganic material.

* * * * *